Mar. 13, 1923.
F. GAHM
AUTOMOBILE ATTACHMENT
Filed Nov. 30, 1921
1,448,059
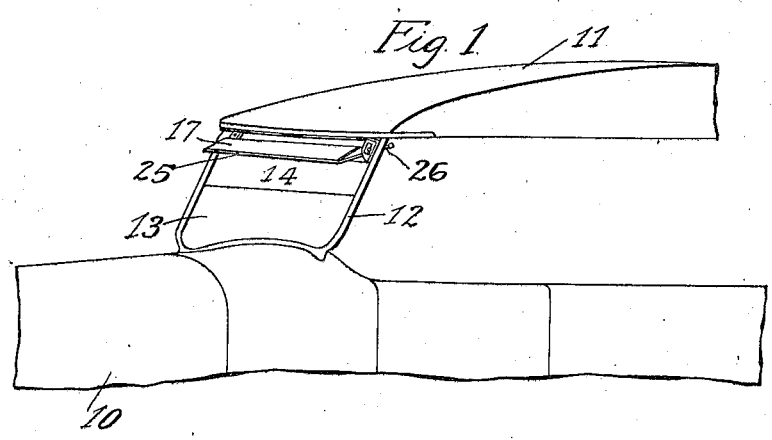
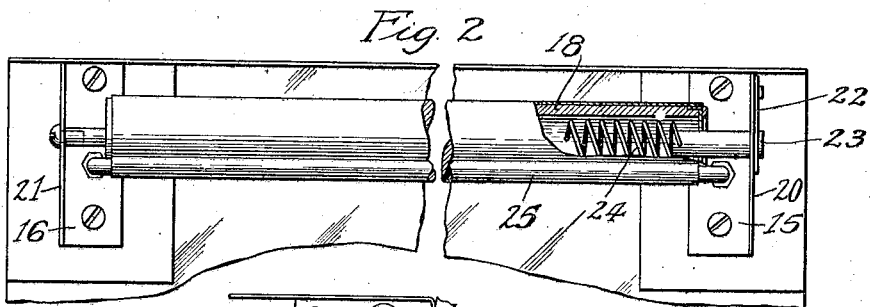
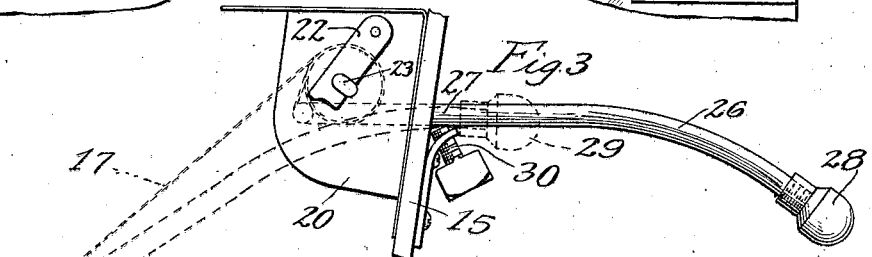
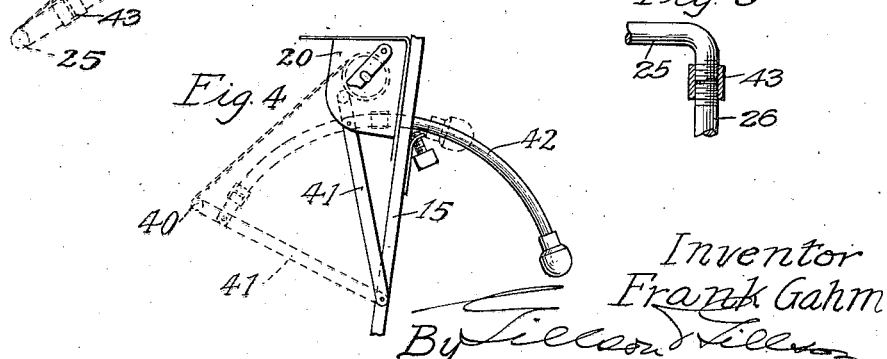
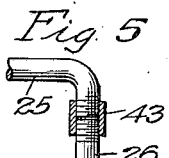
Inventor
Frank Gahm
By
Attorneys Patented Mar. 13, 1923.

1,448,059

UNITED STATES PATENT OFFICE.

FRANK GAHM, OF STREATOR, ILLINOIS.

AUTOMOBILE ATTACHMENT.

Application filed November 30, 1921. Serial No. 518,901.

*To all whom it may concern:*

Be it known that I, FRANK GAHM, a citizen of the United States, and resident of Streator, county of La Salle, and State of Illinois, have invented certain new and useful Improvements in Automobile Attachments, of which the following is a specification and which are illustrated in the accompanying drawings, forming a part thereof.

The invention relates to an improved adjustable awning for automobiles, adapted to be secured above the wind shield; its object being to shield the driver's eyes from the direct rays of the sun and rain.

In the accompanying drawings:

Fig. 1 is a perspective view showing one form of the awning secured to the frame of the wind shield of the automobile, a portion of the automobile body being also shown;

Fig. 2 is a front view of the awning and a portion of the wind shield, the awning roller being shown partly in section;

Fig. 3 is a side view of the awning, full lines indicating the furled and dotted lines the extended position;

Fig. 4 is a side view of a modification and Fig. 5 shows in detail the joint used in the preferred form of the invention for rigidly and detachably connecting the awning operating rods to the cross-rod of the awning.

An automobile body is designated generally by the reference numeral 10, and is shown as provided with the usual top 11 and windshield 12, having upper and lower panes 13, 14. The side members of the wind shield or uprights of the top frame are designated by reference numerals 15, 16.

According to the present invention an awning 17 is secured above and in front of the driver's seat, preferably just above the upper pane of the wind shield. As shown, a spring roller 18, in which the canvas of the awning 17 furls, is mounted at its opposite ends in brackets or fittings 20, 21, secured to the frame members 15, 16. The spring roller 18 may be of any suitable construction, and, as shown, a latch 22 is hinged to one of the bracket members 20, being adapted to engage the flattened end 23 of the spring roller and thereby prevent unwinding of the roller spring 24.

For extending the awning the cross-bar 25 of a bail-shaped frame is passed through a hem at the end of the canvas, the downwardly curved operating arms 26 of said frame passing through apertures in the frame members 15, 16, to the interior of the car, their ends being preferably provided with knobs 28, 29, which are within easy reach of the driver. The curvature of the arms provides for downward as well as forward extension of the awning, which may be secured in any position intermediate the fully extended or completely furled positions by means of screw clamps 30, which are adapted to engage the curved arms 26, 27.

A modified construction is shown in Fig. 4. In this figure the end of the canvas is secured to the cross rod 40 of a bail-shaped frame whose arms 41 are pivoted to the wind shield frame. Downwardly curved operating arms 42 are secured to each of the arms 41, the operation of the device being substantially the same as in the form previously described.

Preferably the arms, as 26, 27, for operating the awning are jointed to the rod attached to the outer end thereof, as shown at 43. By this arrangement the crating of the device for shipment is greatly simplified, as is also the assembling of the parts when applied to the automobile top.

I claim as my invention—

1. In combination, a spring roller for attachment at the front end of a vehicle top, a flexible awning carried by the roller, a cross-rod attached to the outer end of the awning, and a pair of arms connected to the rod and projecting into the top for extending the awning, said arms being downwardly and forwardly curved from the vehicle top to the said cross-rod when the awning is extended.

2. In combination, a pair of brackets for attachment to the front end of a vehicle top, a spring roller carried by the brackets, a flexible awning carried by the roller, a rod attached to the outer end of the awning, said rod having rearwardly curved end portions, a pair of operating arms rigidly and detachably secured to the said ends and projecting to the top for extending the awning.

3. In combination, a spring roller for attachment to the frame of a wind shield, a flexible awning carried by the roller, a cross-rod attached to the outer end of the awning, a pair of curved operating arms connected to the cross-rod and projecting through the windshield frame for extending the awning, clamps secured at the inner side of the wind shield for engaging said arms to hold the same in adjusted position.

4. In combination, a pair of brackets for attachment to the front end of the vehicle top, a spring roller carried by the brackets, a flexible awning carried by the roller, a cross-rod attached to the outer end of the awning, and having rearwardly curved end portions, a pair of operating arms rigidly and detachably connected to the cross rod and projecting into the top for extending said awning, said arms being forwardly and downwardly curved from said top to the said cross rods when the awning is extended, and clamps for holding said arms in adjusted position.

5. In combination, a pair of brackets for attachment to the wind shield frame of an automobile, a spring roller carried by the brackets, a flexible awning carried by the roller, a cross-rod attached to the outer end of the awning, a pair of operating arms connected to the cross-rod and projecting through the windshield frame, said arms being curved downwardly and forwardly from the wind shield to the said cross-rod, whereby downward and forward extension of the awning is secured.

6. In combination, a pair of brackets for attachment to the front end of a vehicle top, a spring roller carried by the brackets, a flexible awning carried by the roller, a cross-rod attached to the outer end of the awning having rearwardly curved end portions integral therewith, the said ends being screw-threaded, a pair of operating arms each having one end rigidly and detachably connected to the corresponding rearwardly curved end portion of the cross-bar, and each arm projecting rearwardly to the interior of the vehicle within reach of the driver's seat.

FRANK GAHM.